US006799975B1

(12) United States Patent
Dunn

(10) Patent No.: US 6,799,975 B1
(45) Date of Patent: Oct. 5, 2004

(54) MODULAR CONFINED SPACE RESCUE TRAINING SIMULATOR

(76) Inventor: Michael L. Dunn, 5013 Pecan Grove Rd., Port Allen, LA (US) 70767

( * ) Notice: Subject to any disclaimer, the term of this patent is extended or adjusted under 35 U.S.C. 154(b) by 0 days.

(21) Appl. No.: 10/209,587

(22) Filed: Jul. 29, 2002

Related U.S. Application Data

(60) Provisional application No. 60/308,691, filed on Jul. 30, 2001.

(51) Int. Cl.[7] ................................................ G09B 9/00
(52) U.S. Cl. ..................... 434/365; 434/219; 434/226; 434/29
(58) Field of Search .......................... 434/401, 29, 219; 434/226; 296/24.1; 472/136

(56) References Cited

U.S. PATENT DOCUMENTS

| | | | | |
|---|---|---|---|---|
| 4,526,548 A | * | 7/1985 | Livingston | .................. 434/226 |
| 5,752,835 A | * | 5/1998 | Whitmer, Sr. | ............... 434/226 |

FOREIGN PATENT DOCUMENTS

| | | | | |
|---|---|---|---|---|
| BR | 9902424 A | * | 1/2001 | ............ G09B/9/00 |

OTHER PUBLICATIONS

Web page for Firemaster Oilfield Service Inc, Apr. 22, 2001.*
Web page for Agents Private International Ltd. "Mobile Confined Space Training Simulator".*
Web page for Pro–Safe Fire Training Systems Inc.*
Web page for Safety Boss Training.*
Web page: Corporate Safety Services International, Ltd. (2 pgs) re Training.
Web page: Corporate Safety Services International, Ltd. (2 pgs) re Company Profile.
Web page: Oklahoma Department of Career and Technology Education "Rescue Training Road Trip" (3 pgs).
Flyer: Technical Safety Services, Group. LLC. "Confined Space Courses" dated Jan. 1, 2001 (2 pgs).
Web page for Mobile Safety Service, Ltd., dated Aug. 1998 (2 pgs).
Web page for "Confined Space Rescue Training", (2 pgs).
Web page:"Confined Space Entry and Rescue Training" (2 pgs).
Web page: Survival Systems Group USA Limited, "Company Profile" (3 pgs); Dated 2002.
Web page: Firemaster Oilfield Services, Inc. (3 pgs).
Web page: ORR Professional Services, "Confined Space Entry Training", (2 pgs).

* cited by examiner

Primary Examiner—Derris H. Banks
Assistant Examiner—Dmitry Suhol
(74) Attorney, Agent, or Firm—Mark D. Miller

(57) ABSTRACT

A mobile confined space rescue training simulation unit having a simple adjustable modular construction that may be set up in any of a number of different confined space rescue scenarios to meet a variety of specialized training needs. The unit is preferably trailer-mounted for portability and has an elongated upper work area and two interior modular sections in communication with each other. The first section allows for establishing different labyrinths through which rescue trainees must travel, and the second section has a retractable sloping floor that may be replaced by simulated machinery such as a rotating shaft with blades. Multiple combinations of training rescue scenarios are possible.

13 Claims, 6 Drawing Sheets

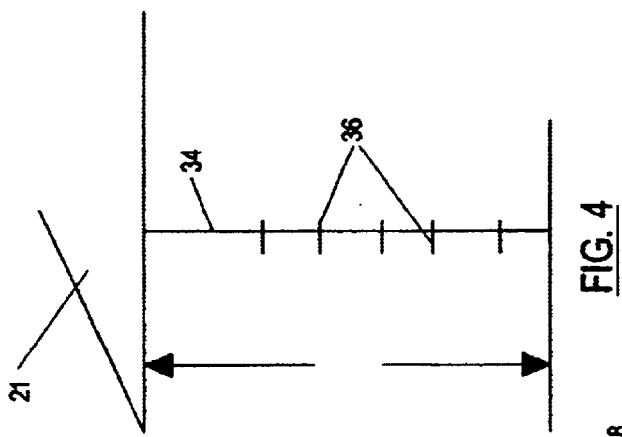
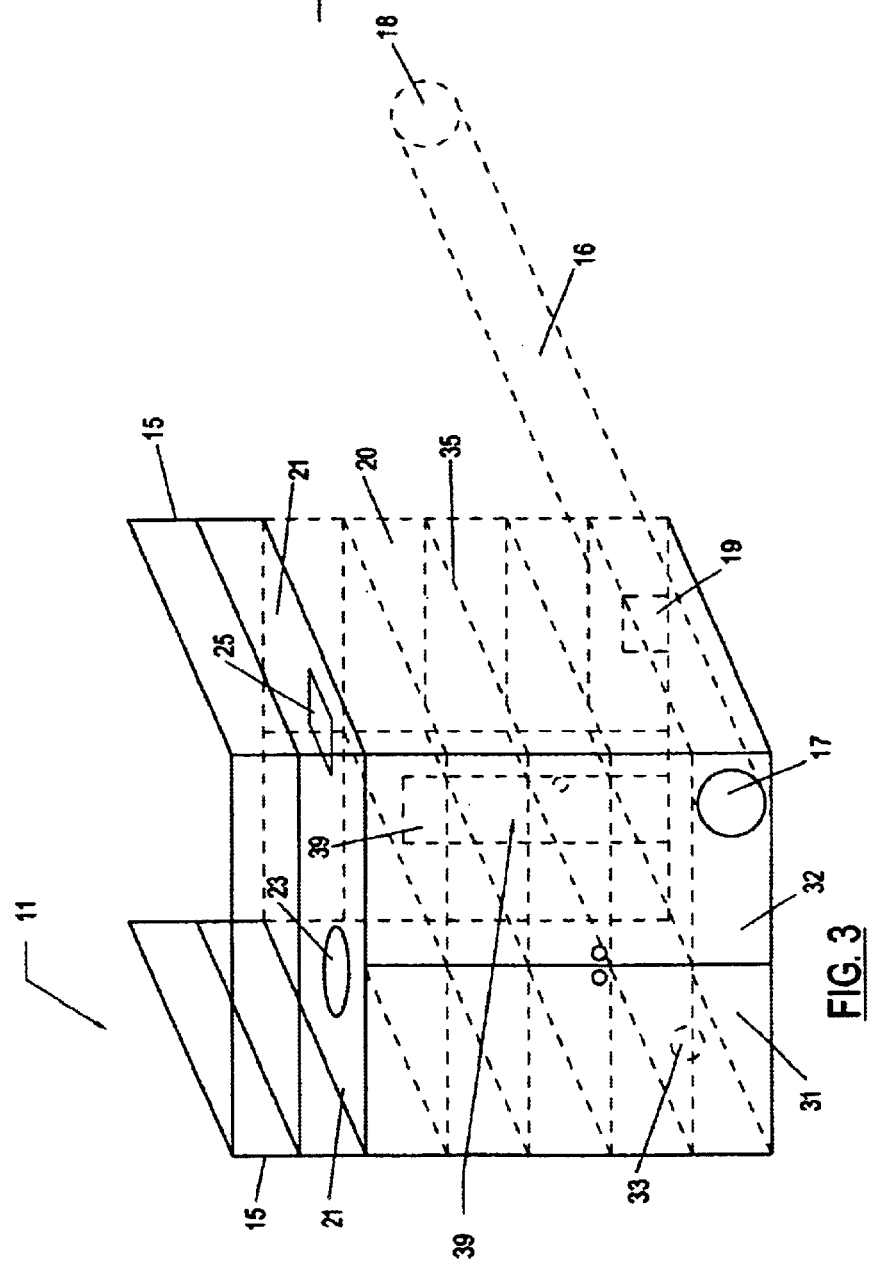

MODULAR CONFINED SPACE RESCUE TRAINING SIMULATOR

This application claims the benefit of U.S. Provisional Application No. 60/308,691 filed Jul. 30, 2001.

BACKGROUND OF THE INVENTION

1. Field of the Invention

The present invention relates to confined space entry and rescue training, and more particularly to a modular mobile training simulator that may be adapted for simulation of a wide variety of different rescue situations.

2. Description of the Prior Art

Rescue professionals and others are continuously presented with different scenarios for extricating victims from confined spaces such as the interiors of tanks, grain elevators, underground manholes, culverts, and the like to name a few. As a result, it is important that rescue professionals and employees in businesses having personnel who work in confined spaces receive regular specialized training in the procedures for rescue of victims from confined spaces. Often rescue efforts are hampered by the presence of toxic fumes, hazardous materials or dangerous machinery, giving rise to the need for additional training procedures for dealing with such situations.

Different confined space rescue training methods and simulators have been developed in the prior art. Mobile training simulators have been developed ranging from simple trailer-mounted tanks having an upper entry opening, to elaborate simulators with sloping floors, changeable maze configurations, and wire mesh walls that allow trainers to view the trainees inside. While the elaborate training simulators may be appropriate for wide ranging rescue training, many municipalities and businesses face budgetary restrictions that make use of such training devices cost prohibitive. As a result, there is a very practical need for an inexpensive yet relatively complete confined space rescue training system.

SUMMARY OF THE INVENTION

The present invention provides a mobile confined space rescue training simulation unit having a simple modular construction that allows for numerous adjustments so as to provide a wide range of different confined space rescue scenarios in order to meet a variety of specialized training needs. The unit is preferably trailer-mounted for portability and has an elongated work area. The interior of the simulator unit is divided into two sections of roughly equal size. Each section is designed to be easily reconfigured using minimum personnel and a few simple hand tools when a different training scenario or evolution is desired.

The first section of the simulator has a sloped wall that can be replaced with a set of rotatable mixer blades. The second section is a simulated industrial column with removable internal trays. Additionally the simulator has a small diameter piping that runs the length of the simulator. A sliding door and a square opening allows for access between the sections. Trainees working on the top of the simulator are protected by a handrail system made from heavy-duty cup and cap type scaffolding. For towing, the handrails can be removed and stored inside the simulator.

The sloped wall section can be accessed from the outside by a single door on the side of the section or from a round opening at the top. The sloped wall is joined in the middle and can be separated into two hinged sections that fold out of the way to allow installation of the mixer blades. The base of the sloped wall has a rectangular-shaped opening that can be closed off for a training exercise on the sloped wall, or opened to allow for access below and behind the sloped wall. Additionally, the sloped wall can be folded out of the way in order to allow one or more different hazardous machinery or material scenarios to be placed in this section of the simulator The mixer blade simulation features a double set of quadruple mixer blades on a rotating shaft. The shaft can be locked out or left to freely rotate during training.

The second section of the simulator is adjacent to the first, and an opening is provided between the two sections to allow access from one section to the other. The second section also includes a set of double doors at one end allowing unrestricted access to the interior. The doors allow access to a plurality of removable and reversible trays having openings at various locations therein. By changing the placement and configuration of the tray and their respective openings, different columns of access may be established, such as vertical, zigzag, rotating, maze, and the like. Both the orientation of the tray openings and spacing between the trays may be changed to meet the desired training needs. Once the trays are placed, access to the second section is gained through either a round or a separate square opening at the top of the section. To add an increased level of difficulty a T-shaped tube may be bolted onto the flanged edge of one of the roof openings to create a horizontal entry point followed by a vertical descent into the trays. The trays may be removed from the simulator to allow for the installation of optional hazardous materials training scenarios. The opening between the two sections allows for combining training scenarios using both sections.

A narrow diameter pipe runs the length of the simulator, and can be used to simulate entry into boilers, storm drains, etc. The pipe may also be used to determine the confinement anxiety levels present in the trainees in, and to teach them how to deal with the high stress that can be caused by confinement.

For hazardous materials training such as rooftop domes and valve leak control, the top of the simulator may be fitted with an optional set of truck and rail car domes with valves that are connected to a water hose for simulated leak control evolutions. Either water or air is piped to the valves, and teams of trainees access the top using a fixed or portable ladder to evaluate and control the leaks.

For barrel rack leak control and containment training, a multi-barrel rack may be installed in the tray section with the barrels in a horizontal configuration. One or more of the barrels is then filled with water. A leak may then be established from a loose barrel bung or from a hole caused by corrosion or mechanical damage.

For compressed gas leak control training, a bank of compressed gas cylinders may be moved into the sloped wall/mixer blades section of the unit, and secured in place or placed on their sides or on top of each other. Teams access the area through the exterior door in order to control the leak.

It is therefore a primary object of the present invention to provide a versatile mobile modular confined space and hazardous materials training simulator that may be adjusted in multiple ways in order to simulate a wide variety of confined space rescue and hazardous material cleanup scenarios.

It is also an important object of the present invention to provide a modular confined space training simulator that is designed to be quickly and easily adjusted to simulate one or more of a large number of different confined space rescue scenarios.

It is also an important object of the present invention to provide a modular confined space training simulator having a first section including a retractable sloping floor that will accommodate a rotatable shaft and beater blade assembly for hazardous machinery training, and a second section for receiving a plurality of adjustable trays having openings therein for simulating a labyrinth through which the rescue trainees travel.

It is a further object of the present invention to provide a confined space training simulator having two adjacent modular sections, each of which may be separately adjusted to simulate a given training scenario, such that the modular sections may be used independently or together to simulate a wide variety of different combined training exercises.

It is a further object of the present invention to provide a modular confined space training simulator having a narrow diameter tube for simulating a culvert and for use in helping trainees recognize and respond to anxiety and stress caused by confinement.

Additional objects of the invention will be apparent from the detailed descriptions and the claims herein.

BRIEF DESCRIPTION OF THE DRAWINGS

FIG. 3 is a perspective rear view of one of the two modular sections of the simulator of the present invention.

FIG. 4 is a side view showing the tray supports in one of the two modular sections of the simulator of the present invention.

DETAILED DESCRIPTION OF A PREFERRED EMBODIMENT

Figure 1:
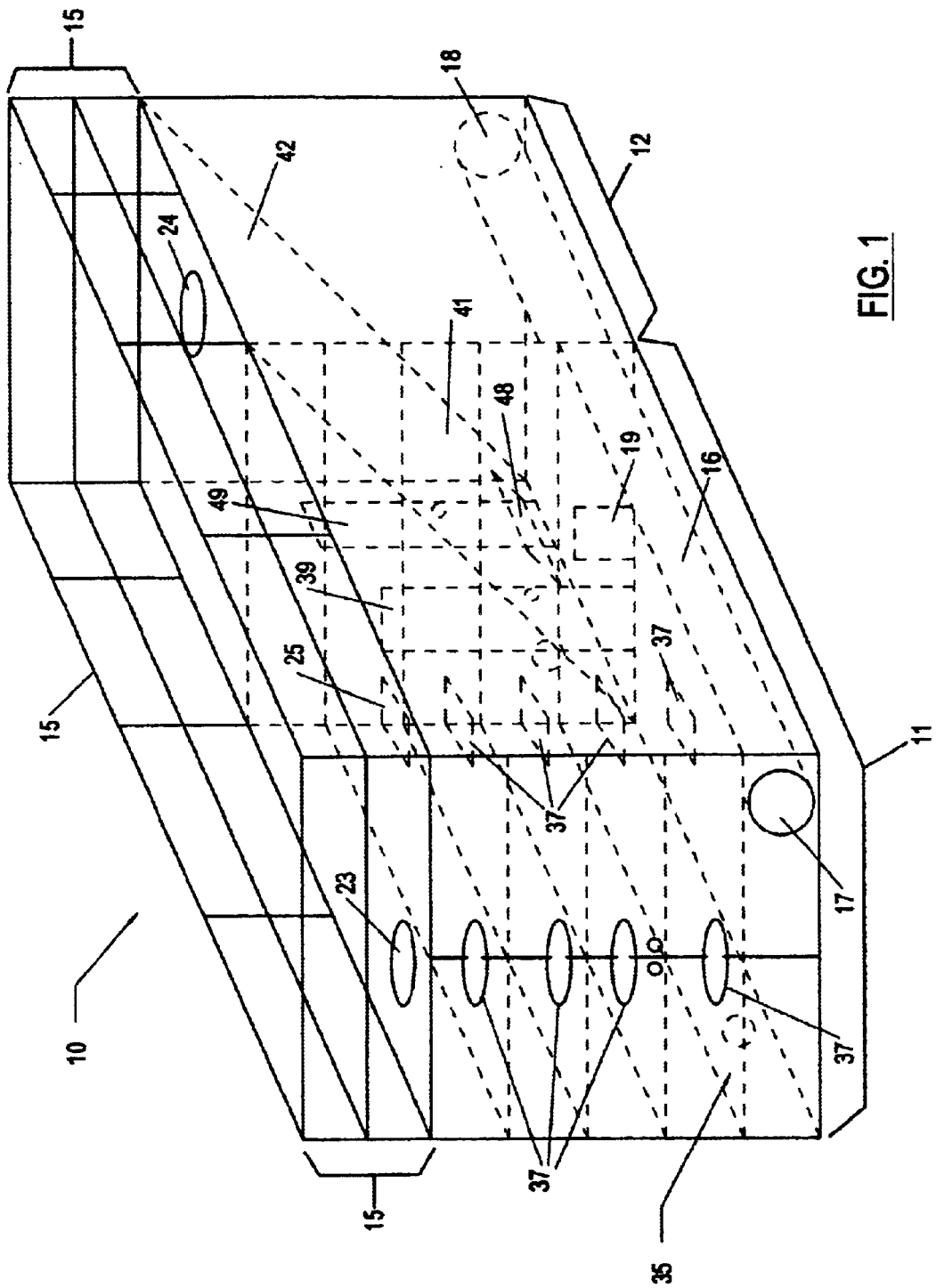
FIG. 1 is a perspective rear view of the confined space training simulator of the present invention showing the two modular interior sections.
Figure 2:
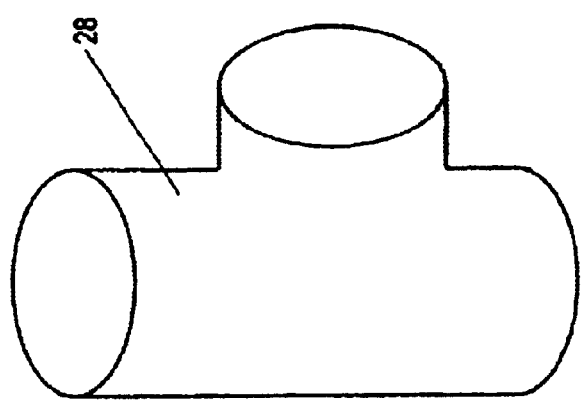
FIG. 2 is a perspective rear view of an optional T-shaped entry tube for attachment to an opening at the top of the simulator.

Referring to the drawings wherein like reference characters designate like or corresponding parts throughout the several views, and referring particularly to FIG. 1, it is seen that the training simulator of the present invention includes a generally rectangular unit 10 divided into two sections 11 and 12. Section 11 is detailed in FIGS. 3–4 and section 12 is detailed in FIGS. 5–6. A removable guard railing 15 is provided at the top of the unit 10 to prevent trainees on top of the unit from falling. An elongated hollow tube 16, having openings 17 & 18 with hatches at either end, extends the length of the unit 10, through both sections 11 and 12. Another opening 19 is provided in the wall 20 separating section 11 from section 12. The roof 21 of section 11 is provided with two openings for access to the interior, a round or oval shaped opening 23 and a rectangular or square opening 25, openings 23 and 25 preferably being of different areas. The roof 22 of section 12 is provided with a single round or oval shaped opening 24. An optional T-shaped tube 28 is provided that may be attached to either of openings 23 or 24 to provide a horizontal path of travel through the tube 28 before the vertical path through the opening 23 or 24.

As seen more clearly in FIGS. 3 and 4, rear section 11 includes a pair of rear doors 31 & 32 that may be opened to allow access to the entire interior of section 11. A central tray support member 34 is provided in tray section 11. A plurality of tray supports 36 (see FIG. 4) are provided on member 34 and, in the walls of section 11 for supporting a plurality of removable trays 35. Tray supports 36 may or may not be evenly spaced apart from each other, depending upon the type of labyrinth to be simulated, but pairs of supports 36 should be directly across from each other to hold trays 35 in a horizontal position. Each tray 35 includes at least one opening therein 37, which may be round, square, oval or rectangular. If multiple openings are provided on trays 35 (as shown in the illustration of FIG. 1), both round/oval and rectangular/square openings having different areas should be used. A vent hole 33 is provided on a sidewall of section 11. The trays 35 may be stacked at different spacings, and turned for different placement of the opening(s) 37 thereon, to establish various combinations of mazes or labyrinths through which the trainees must crawl in a given exercise (described more fully below). A sliding door 39 connects section 11 with section 12 for use in some exercises.

Figure 5:
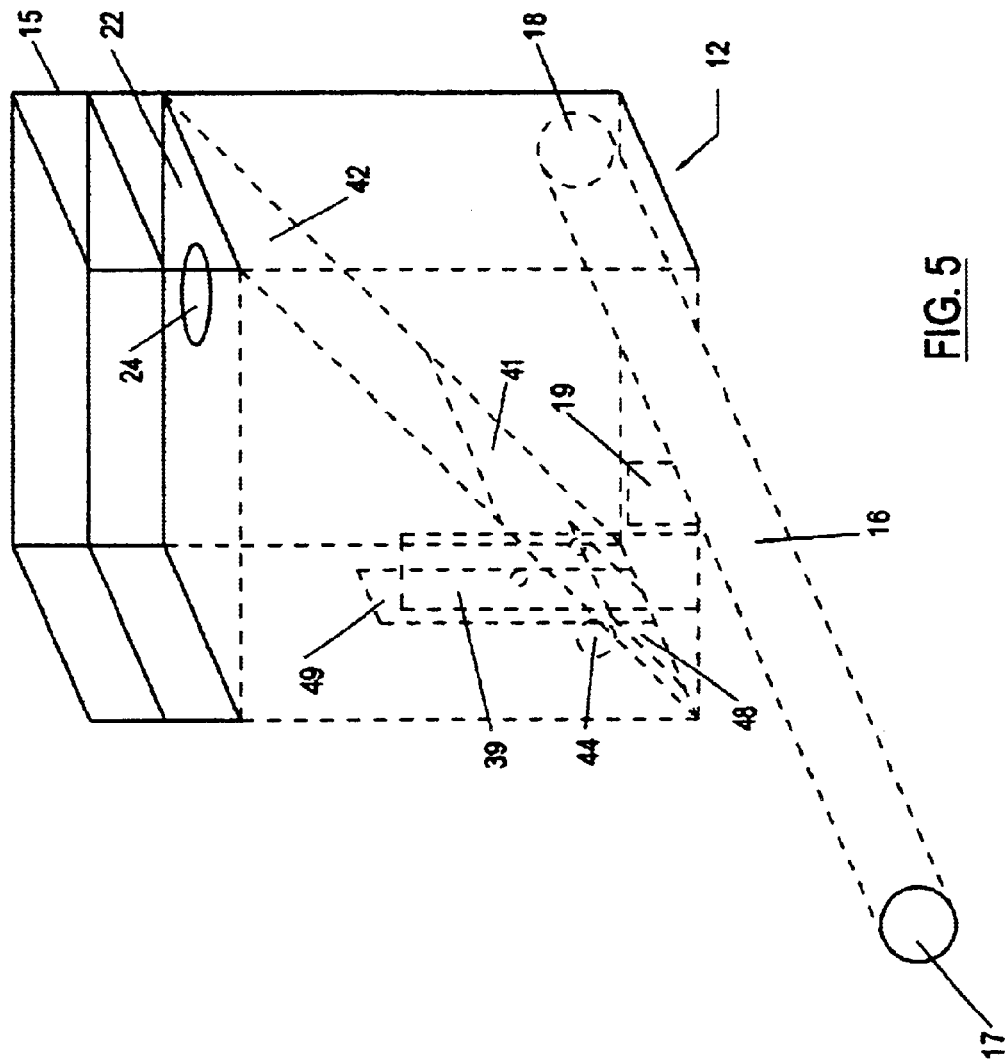
FIG. 5 is a perspective rear view of another of the two modular sections of the simulator of the present invention.
Figure 6:
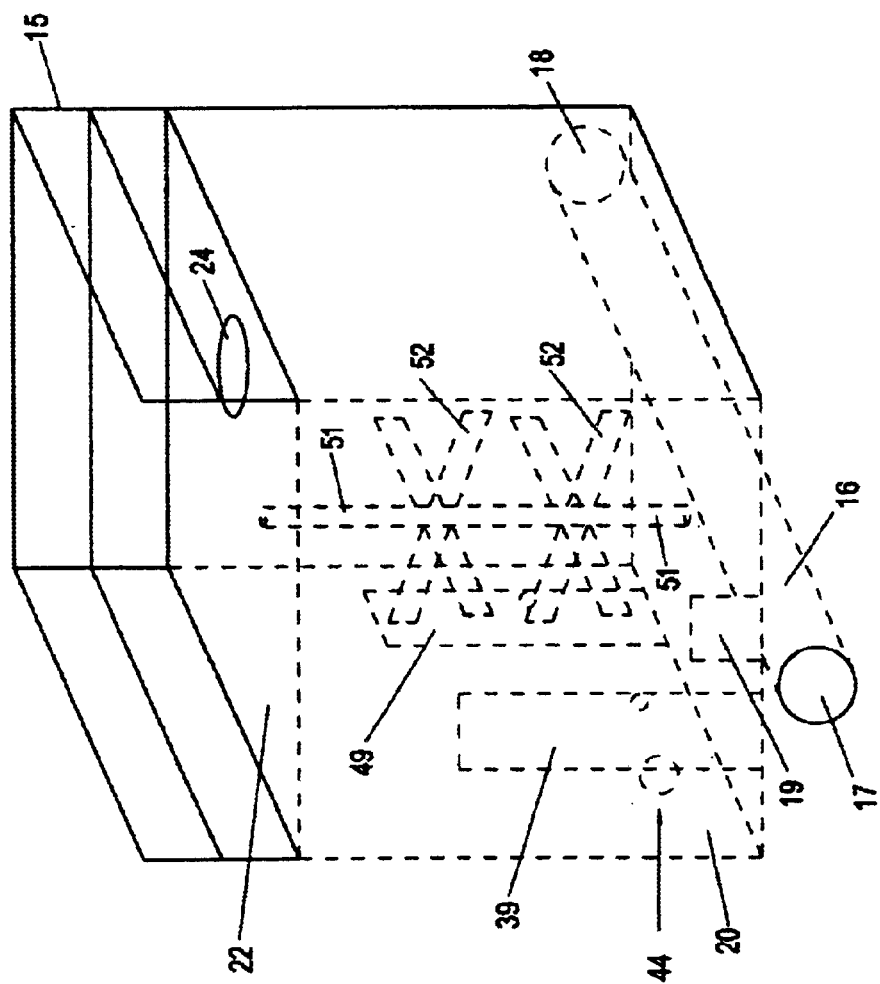
FIG. 6 is a perspective rear view of an alternative embodiment of one of the two modular sections of the simulator of the present invention.
Figure 7:
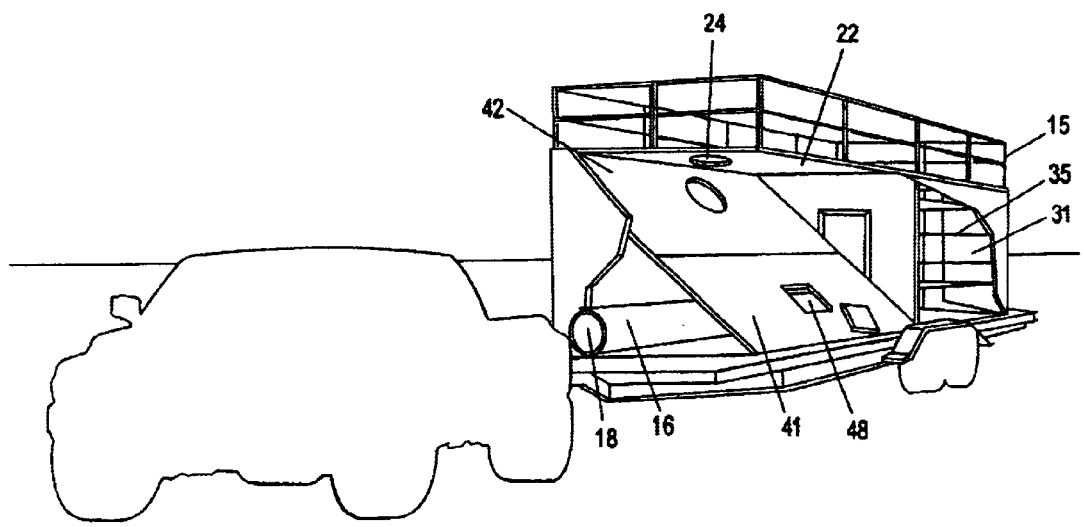
FIG. 7 is an environmental partially cut away view of the invention in use.
Figure 8:
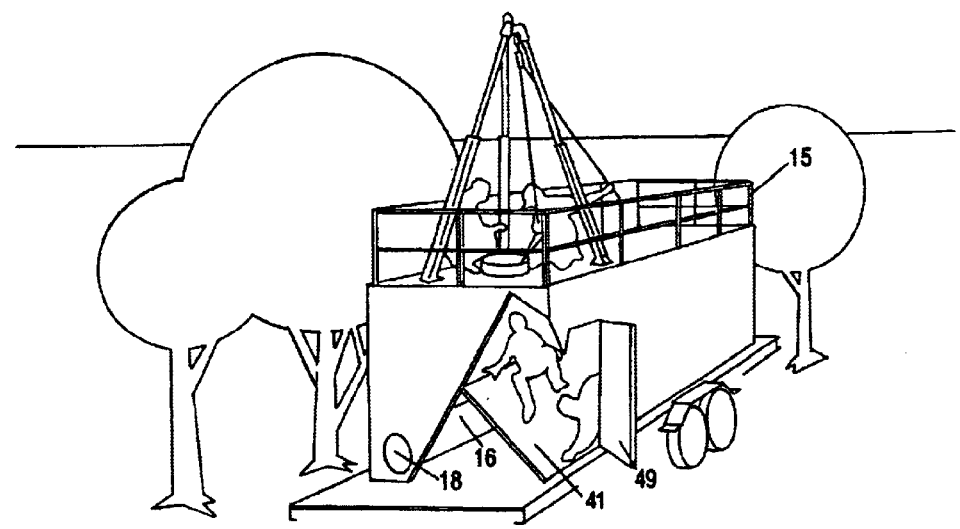
FIG. 8 is another environmental partially cut away view of the invention in use.

As shown in FIG. 5, tube 16 passes through front section 12, and opening 19 as well as door 39 provide connective access between sections 11 and 12. A ventilation opening 44 is provided on an external wall of section 12. A door 49 is provided for direct access from the exterior to the interior of section 12. A 2-piece sloping wall made of panels 41 and 42 is provided inside section 12. Each of panels 41 and 42 are hingedly attached to a corner of section 12, with lower panel 41 attached near a floor corner, and upper panel 42 attached near a ceiling corner. Panels 41 and 42 may be attached to each other as shown in FIGS. 1 and 5 to provide a sloping floor for training. An opening 48 is provided in lower panel 41 to allow access below the sloping floor formed by joined panels 41 and 42. Panels 41 and 42 may be detached and folded out of the way to allow for the installation of one or more rotatable shafts 51 with corresponding mixing blades 52 as shown in FIG. 6.

Set forth below are an illustrative but not exhaustive series of examples showing the use of the simulator of the present invention:

Confined Space/High Angle Training Evolutions:

EXAMPLE 1

In-line Vertical Rescue. Access is made through a top opening 23 or 25. All tray openings 37 arc in-fine and rescuers work their way vertically through the trays 35 to the victim, who is then packaged and removed vertically through the trays to the roof 21 of the simulator and then lowered to the ground.

EXAMPLE 2

Offset Vertical Rescue. Access is made through a top opening 23 or 25. All tray openings 37 are offset and rescuers work their way in a zigzag manner through the labyrinth of trays to the victim, who is then packaged and removed through the trays to the roof of the simulator and then lowered to the ground.

EXAMPLE 3

In-line Vertical/Horizontal Rescue. Access is made through a top opening 23 or 25. All tray openings 37 are in-line and rescuers work their way vertically to the bottom of section 11 of the simulator which allows horizontal access through opening 19 to the victim in section 12, who is then packaged and removed horizontally through opening 19, and then vertically through the tray openings 37 to the roof 21 of the simulator and then lowered to the ground.

EXAMPLE 4

Offset Vertical/Horizontal Rescue. Access is made through a top opening 23 or 25. All tray openings 37 are offset and rescuers work their way in a zigzag pattern through the labyrinth to the bottom of section 11 of the simulator which allows horizontal access through opening 19 to the victim in section 12, who is then packaged and removed horizontally through opening 19, and then through the tray openings 37 to the roof 21 of the simulator and then lowered to the ground.

EXAMPLE 5

Sloped Wall Rescue. Access is made to the top of the wall 42 through opening 24 in the roof 22 of simulator section 12. Rescuers access the victim at the bottom of the wall 41, who is then packaged and moved up the slope 41–42 to the roof 22 of the simulator and then lowered to the ground.

EXAMPLE 6

Sloped Wall Back Side Rescue. Access is made to the top of the wall 42 through opening 24 in the roof 22 of simulator section 12. Rescuers travel to the bottom of the wall 41 and through the opening 48 therein, which allows access to the victim below wall 41. The victim is then packaged and moved up the slope to the roof of the simulator and then lowered to the ground.

EXAMPLE 7

Sloped Wall/Bottom Tray Rescue. Access is made to the top of wall 42 through opening 24 in the roof 22 of simulator section 12. Rescuers travel to the bottom of the wall 41 and through the opening 48, which allows access to opening 19 into the tray area of section 11 and the victim. The victim is packaged and moved from the tray area 11 to the bottom side of the wall 41, through the wall opening 48 and up the slope to the roof 22 of the simulator then lowered to the ground.

EXAMPLE 8

Sloped Wall/Tray Rescue In-Line. Access is made to the top of wall 42 through opening 24 in the roof 22 of simulator section 12. Rescuers travel to the bottom of the wall 41 and through the opening 48 that allows access to opening 19 into the tray area of section 11. All tray openings 37 are in-line and rescuers work their way vertically up through the trays to the victim, who is then packaged and moved vertically down through the tray openings 37 and out through the horizontal opening 19 to the bottom side of the sloped wall. The victim is then moved through opening 48 up the sloped wall through opening 24 to the roof 22 of the simulator and lowered to the ground.

EXAMPLE 9

Sloped Wall/Tray Rescue Offset. Access is made to the top of wall 42 through opening 24 in the roof 22 of simulator section 12. Rescuers travel to the bottom of the wall 41 and through the opening 48 that allows access to opening 19 into the tray area of section 11. Tray openings 37 are offset and rescuers work their way up through the labyrinth of trays in zigzag fashion to the victim, who is then packaged and moved back through the tray openings 37 and out through the horizontal opening 19 to the bottom side of the sloped wall. The victim is then moved through opening 48 up the sloped wall through opening 24 to the roof 22 of the simulator and lowered to the ground.

EXAMPLE 10

Elongated Pipe. Pipe 16 is used for both victim rescue in a simulated boiler or piping system as well as a confinement anxiety-training tool The victim is placed at one end 18 of the pipe 16 and a rescuer has to enter the other end 17, attach a retrieval system to the victim, exit the pipe 16 and remove the victim. When used for confinement anxiety training the rescuers are briefed before entry on signs and symptoms of confinement anxiety and give mental techniques to use to control the anxiety and allow them to travel the length of the pipe without any outside assistance.

EXAMPLE 11

High Angle Rescue. The handrails 15 on top of the simulator are removable and can be stored inside the simulator when it is on the road. The handrails are heavy-duty cup and cap type system scaffolding that allows them to be used as an anchor point for rigging rope rescue systems. The victim can be packaged and lowered over the handrails without an additional high-directional anchor point; the victim can be packaged and slid down a fire department extension ladder, or the victim can be packaged and the ladder used in a ladder fulcrum rescue.

The simulator of the present invention is designed to be as flexible as possible and to meet a variety of specialized training needs. In the preferred embodiment, it is built on a trailer for portability and has a working area of approximately 8'×8'×10'. The simulator is divided into two sections having approximate dimensions of 8'×8'×5'. In the tray section 11, the central tray support member 34 divides the section into two 4'×5' areas. The diameter of pipe 16 is preferably 16" but may be larger or smaller as desired. Opening 19 is preferably a square 16" opening allowing for access between sections 11 and 12. Opening 24 is preferably a 24" round opening having a flange for attachment of T-shaped tube 28 having a corresponding diameter (e.g. 24"). Opening 23 in section 11 is preferably a 24" round opening, and opening 25 is preferably a 16" square opening.

Preferably, the simulator comes with several sets of trays. Each tray is made up of a pair of 2'×5' panels having openings 37 therein. The tray supports 36 are preferably spaced approximately 18" apart and each 2'×5' section of tray has either a 16" square opening or a 24" round opening 37 for vertical access through the trays.

In alternative embodiments, a motor home awning can be attached to one side of the simulator to provide shade and a place to set up a rehab area, and a trailer hitch can be designed to match the connection, within legal weight limits, of the suitable towing vehicle. A compressed air cascade system can be installed on the trailer for use with airline respiratory equipment, and a ventilation fan can be supplied for climate control within the simulator.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A portable modular confined space training simulator comprising a trailer-mounted unit made up of two adjoining chambers in communication with each other, the first chamber having at least one access opening in the roof thereof, a plurality of interior supports for holding removable trays, a plurality of removable trays for placement on said supports, each tray having at least one opening therein, and at least one door on a wall of said first chamber for accessing the interior thereof; and a second chamber having at least one access opening in the roof thereof, a retractable sloping interior wall made of two panels, the first panel being hingedly attached to the ceiling of said second chamber and the second panel being hingedly attached to the floor of said chamber, said panels being detachably connectable to each other to form said retractable sloping wall, and at least one door on a wall of said second chamber for accessing the interior thereof.

2. The training simulator of claim 1 wherein an access opening is provided in said second panel.

3. The training simulator of claim 2 wherein an elongated hollow pipe having an exterior inlet and exterior outlet is provided in said unit extending through and between said first and second chambers.

4. A portable modular confined space training simulator comprising a trailer-mounted unit made up of two adjoining chambers in communication with each other, the first chamber having at least one access opening in the roof thereof, a plurality of interior supports for holding removable trays, a plurality of removable trays for placement on said supports, each tray having at least one opening therein, and at least one door on a wall of said first chamber for accessing the interior thereof; and a second chamber having at least one access opening in the roof thereof, a retractable sloping interior wall made of two panels, the first panel being hingedly attached to the ceiling of said second chamber and the second panel being hingedly attached to the floor of said chamber, said panels being detachably connectable to each other to form said retractable sloping wall, and at least one door on a wall of said second chamber for accessing the interior thereof, wherein said sloping panels are retracted and at least one rotatable vertical shaft having a plurality of blades located thereon is provided in said second chamber as a simulated machinery hazard.

5. A portable modular confined space training simulator comprising a trailer-mounted unit made up of two adjoining chambers in communication with each other, the first chamber having at least one access opening in the roof thereof, a plurality of interior supports for holding removable trays, a plurality of removable trays for placement on said supports, each tray having at least one opening therein, and at least one door on a wall of said first chamber for accessing the interior thereof, and a second chamber having at least one access opening in the roof thereof, a retractable sloping interior wall made of two panels, the first panel being hingedly attached to the ceiling of said second chamber and the second panel being hingedly attached to the floor of said chamber said second panel having an access opening therein, said panels being detachably connectable to each other to form said retractable sloping wall, and at least one door on a wall of said second chamber for accessing the interior thereof wherein an elongated hollow pipe having an exterior inlet and exterior outlet is provided in said unit extending through and between said first and second chambers, and wherein a T-shaped tube is installed onto at least one of the roof access openings of at least one of said chambers.

6. The training simulator of claim 5 wherein a removable railing is installed around the perimeter of the roof of said unit.

7. The training simulator of claim 6 wherein at least one ventilation opening is provided in each of said chambers.

8. A portable modular confined space training simulator comprising a trailer-mounted unit made up of two adjoining chambers in communication with each other, the first chamber having at least one access opening in the roof thereof, a plurality of interior supports for holding removable trays, a plurality of removable trays for placement on said supports, each tray having at least one opening therein, and at least one door on a wall of said first chamber for accessing the interior thereof; and a second chamber having at least one access opening in the roof thereof, a retractable sloping interior wall made of two panels, the first panel being hingedly attached to the ceiling of said second chamber and the second panel being hingedly attached to the floor of said chamber, said panels being detachably connectable to each other to form said retractable sloping wall, and at least one door on a wall of said second chamber for accessing the interior thereof wherein a T-shaped tube is installed onto at least one of the roof access openings of at least one of said chambers.

9. A training simulator of claim 8 wherein an access opening is provided in said second panel.

10. A training simulator of claim 8 wherein an elongated hollow pipe having an exterior inlet and exterior outlet is provided in said unit extending through and between said first and second chambers.

11. A training simulator of claim 8 wherein a removable railing is installed around the perimeter of the roof of said unit.

12. A training simulator of claim 8 wherein at least one ventilation opening is provided in each of said chambers.

13. A portable modular confined space training simulator comprising a trailer-mounted unit made up of two adjoining chambers in communication with each other, the first chamber having at least one access opening in the roof thereof, a plurality of interior supports for holding removable trays, a plurality of removable trays for placement on said supports, each tray having at least one opening therein, and at least one door on a wall of said first chamber for accessing the interior thereof; and a second chamber having at least one access opening in the roof thereof, and at least one door on a wall of said second chamber for accessing the interior thereof, wherein at least one rotatable vertical shaft having a plurality of blades located thereon is provided in said second chamber as a simulated machinery hazard.

* * * * *